United States Patent
Iseki et al.

(10) Patent No.: US 7,125,946 B2
(45) Date of Patent: Oct. 24, 2006

(54) ETHYLENE COPOLYMER

(75) Inventors: Yuki Iseki, Sodegaura (JP); Yasuro Suzuki, Kisarazu (JP); Tadahiro Mitsuno, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/809,928

(22) Filed: Mar. 26, 2004

(65) Prior Publication Data

US 2004/0249101 A1    Dec. 9, 2004

(30) Foreign Application Priority Data

Mar. 28, 2003    (JP)    ............................. 2003-090847

(51) Int. Cl.
*C08F 10/14*    (2006.01)
*C08F 10/08*    (2006.01)
*C08F 10/02*    (2006.01)
*C08G 61/04*    (2006.01)

(52) U.S. Cl. ............................... 526/348.6; 526/348.2; 526/348.5; 526/348.3; 526/348; 526/352.2; 528/396

(58) Field of Classification Search ............. 526/348.6, 526/348.2, 348, 352, 352.2; 528/396
See application file for complete search history.

(56) References Cited

U.S. PATENT DOCUMENTS

| | | | |
|---|---|---|---|
| 5,374,700 A | | 12/1994 | Tsutsui et al. |
| 5,459,217 A | | 10/1995 | Todo et al. |
| 5,700,895 A | * | 12/1997 | Kanda et al. ................ 526/348 |
| 5,710,224 A | * | 1/1998 | Alt et al. ..................... 526/160 |
| 5,747,620 A | * | 5/1998 | Machida et al. .......... 526/348.3 |
| 5,798,427 A | * | 8/1998 | Foster et al. ................. 526/352 |
| 5,840,815 A | | 11/1998 | Tsutsui et al. |
| 5,883,205 A | | 3/1999 | Tsutsui et al. |
| 6,121,402 A | * | 9/2000 | Machida et al. ............. 526/352 |
| 6,225,410 B1 | * | 5/2001 | Sugimura et al. ............ 525/191 |
| 6,258,912 B1 | * | 7/2001 | Howard et al. .............. 526/348 |
| 6,329,465 B1 | * | 12/2001 | Takahashi et al. ........... 525/191 |
| 6,420,298 B1 | * | 7/2002 | Mink et al. .................. 502/113 |
| 6,462,161 B1 | * | 10/2002 | Cady et al. .................. 526/348 |
| 6,518,385 B1 | * | 2/2003 | Chai ........................ 526/348.2 |
| 6,642,339 B1 | * | 11/2003 | Chai et al. ................. 526/348.1 |
| 6,706,822 B1 | * | 3/2004 | Guenther et al. ......... 525/333.7 |
| 6,914,113 B1 | * | 7/2005 | McLeod et al. ............. 526/352 |
| 6,995,229 B1 | * | 2/2006 | Kashiwa et al. .......... 526/348.6 |

FOREIGN PATENT DOCUMENTS

| | | | |
|---|---|---|---|
| EP | 640 627 A1 | * | 3/1995 |
| JP | 04-213309 A | | 8/1992 |
| JP | 06-009724 A | | 6/1994 |

* cited by examiner

*Primary Examiner*—David W. Wu
*Assistant Examiner*—Rip A Lee
(74) *Attorney, Agent, or Firm*—Fitch, Even, Tabin & Flannery

(57) ABSTRACT

The invention provides an ethylene-α-olefin copolymer which is superior in extrusion molding processability. The present invention is to provide a copolymer of ethylene and α-olefin of from 4 to 20 carbon atoms, having melt flow rate of from 1 to 100 g/10 min, an activation energy for melt flow of 60 kJ/mol or more, melt tension at 190° C. (MT), intrinsic viscosity ($[\eta]$) and a chain length A which satisfy the formula (1) to (3), wherein the chain length A is a chain length at peak position of a logarithm normal distribution curve of a component having the highest molecular weight among logarithm normal distribution curves obtained by dividing a chain length distribution curve obtained by gel permeation chromatography measurement into at least two logarithm normal distribution curves.

5 Claims, No Drawings

ETHYLENE COPOLYMER

FIELD OF THE INVENTION

The present invention relates to an ethylene-α-olefin copolymer, and in more detailed an ethylene-α-olefin copolymer which is superior in extrusion molding processability.

BACKGROUND OF THE INVENTION

Ethylene polymers are conventionally used in a lot of fields, for example, used in extrusion molded articles such as films, sheets and the like. Extrusion molded articles are required be excellent in molding processability controlled by extrusion torque, melt tension and the like, mechanical properties such as rigidity, impact strength and the like, and further, appearances (optical properties) such as the surface smoothness, gloss, transparency and the like of a film or sheet.

For example, JP 4-213309A describes an ethylene copolymers comprising a repeating unit derived from ethylene and a repeating unit derived from an α-olefin having 3 to 20 carbon atoms, wherein the density is from 0.86 to 0.95 g/cm$^3$, MFR is from 0.001 to 50 g/10 minutes, the melt tension and MFR satisfy a specific relation, and the temperature at the position of the maximum peak of a heat absorption curve measured by DSC, and the density satisfy a specific relation, as an example of ethylene copolymers excellent in melt tension and having narrow composition distribution.

The above-mentioned ethylene copolymers described in JP 4-213309A has high melt tension, however, may not necessarily satisfy the requirements regarding the appearance of an extrusion molded article obtained from the copolymers, and there has been desired further improvement in the extrusion molding processability of an ethylene copolymer and in the balance between the appearance and impact strength of an extrusion molded article.

SUMMARY OF THE INVENTION

The invention provides an ethylene-α-olefin copolymer which is superior in extrusion molding processability.

The present invention is a copolymer of ethylene and α-olefin of from 4 to 20 carbon atoms, having melt flow rate of from 1 to 100 g/10 min, an activation energy for melt flow of 60 kJ/mol or more, melt tension at 190° C. (MT), intrinsic viscosity ($[\eta]$) and a chain length A which satisfy the following formula (1) to (3), wherein the chain length A is a chain length at peak position of a logarithm normal distribution curve of a component having the highest molecular weight among logarithm normal distribution curves obtained by dividing a chain length distribution curve obtained by gel permeation chromatography measurement into at least two logarithm normal distribution curves, $$2 \times MFR^{-0.59} < MT < 20 \times MFR^{-0.59} \tag{1}$$

$$1.02 \times MFR^{-0.094} < [\eta] < 1.50 \times MFR^{-0.156} \tag{2}$$

$$\log A \geq -0.0815 \times \log (MFR) + 4.05 \tag{3}$$

Also, the present invention provide a copolymer of ethylene and α-olefin of from 4 to 20 carbon atoms, having melt flow rate of from 1 to 100 g/10 min, an activation energy for melt flow of 60 kJ/mol or more, melt tension at 190° C. (MT), intrinsic viscosity ($[\eta]$) and a characteristic relaxation time ($\tau$; unit is sec) at a temperature of 190° C. which satisfy the following formula (1), (2) and (4):

$$2 \times MFR^{-0.59} < MT < 20 \times MFR^{-0.59} \tag{1}$$

$$1.02 \times MFR^{-0.094} < [\eta] < 1.50 \times MFR^{-0.156} \tag{2}$$

$$\tau \geq 8.1 \times MFR^{-0.746} \tag{4}$$

DETAILED DESCRIPTION OF PREFERRED EMBODIMENTS

The ethylene-α-olefin copolymer of the present invention is an ethylene-α-olefin copolymer comprising a repeating unit derived from ethylene and a repeating unit derived from an α-olefin having 4 to 20 carbon atoms.

Examples of the α-olefin having 4 to 20 carbon atoms include 1-butene, 4-methyl-1-pentene, 1-hexene, 1-octene, 1-decene and the like. More preferable are 4-methyl-1-pentene and 1-hexene.

Among the above α-olefin(s), two or more kinds of α-olefin may be used together and, for example, a combination includes that of 1-butene and 4-methyl-1-pentene, 1-butene and 1-hexene, 1-butene and 1-octene, 1-butene and 1-decene, and the like, a preferable combinations are those of 1-butene and 4-methyl-1-pentene, and 1-butene and 1-hexene.

The content of the repeating unit derived from ethylene is from 50 to 99 wt % based on the total weight (100 wt %) of an ethylene-α-olefin copolymer. The content of the repeating unit derived from an α-olefin having 4 to 20 carbon atoms is from 1 to 50 wt % based on the total weight (100 wt %) of an ethylene-α-olefin copolymer.

The ethylene-α-olefin copolymer of the present invention may also contain repeating units derived from other monomers than ethylene and α-olefins having 4 to 20 carbon atoms. Examples of other monomers include conjugated dienes (for example, butadiene, isoprene), non-conjugated dienes (for example, 1,4-pentadiene), acrylic acid, acrylates (for example, methyl acrylate, ethyl acrylate), methacrylic acid, methacrylates (for example, methyl methacrylate, ethyl methacrylate), vinyl acetate and the like.

The ethylene-α-olefin copolymer of the present invention is preferably a copolymer of ethylene and α-olefin of 5 to 10 carbon atoms, or copolymer of ethylene, 1-butene and α-olefin of 5 to 10 carbon atoms, further preferably a copolymer of ethylene and α-olefin of 6 to 10 carbon atoms, or copolymer of ethylene, 1-butene and α-olefin of 6 to 10 carbon atoms. Examples of the copolymer of ethylene-α-olefin include ethylene-1-hexene copolymer, ethelene-4-methyl-1-pentene copolymer and ethylene-1-octene copolymer, and among them, ethylene-1-hexene copolymer is preferable. Further, terpolymers of ethylene, α-olefin of 6 to 10 carbon atoms and 1-butene is preferable, and include ethylene-1-butene-1-hexene terpolymer, ethylene-1-butenen-4-methyl-1-pentene terpolymer and ethylene-1-butene-1-octene terpolymer. Among them, ethylene-1-butene-1-hexene terpolymer is preferable.

The ethylene-α-olefin copolymer of the present invention has a melt flow rate (MFR; unit is g/10 minutes) of from 1 to 100, preferably from 1 to 30, more preferably from 1.2 to 15, further preferably from 1.5 to 8. The melt flow rate is measured under a load of 21.18 N (2.16 Kg) at 190° C. according to a method defined by JIS K7210-1995. When MFR is measured, a polymer to which antioxdant has been previously added is used.

The ethylene-α-olefin copolymer of the present invention is a copolymer of which melt flow rate and melt tension at 190° C. (MT; unit is cN) satisfy the relation of the following formula (1):

$$2 \times MFR^{-0.59} < MT < 20 \times MFR^{-0.59} \quad (1)$$

A preferable ethylene-α-olefin copolymer of the present invention may be a polymer having a structure of like long chain branching which are entangled closely. And it is considered that a melt tension of ethylene-α-olefin copolymer of the present invention is higher than that of the conventional ethylene-α-olefin copolymer having as same MFR as the ethylene-α-olefin copolymer of the present invention due to such structure, and a melt tension and MFR of the ethylene-α-olefin copolymer of the present invention satisfies an above-mentioned formula (1).

The ethylene-α-olefin copolymer of the present invention satisfies the relation of the formula (1), and the copolymer of the present invention is excellent in extrusion molding processability. When the relation of $2 \times MFR^{-0.59} < MT$ is not satisfied in the formula (1) in the case where, for example, melt tension is too low, extrusion molding processability may deteriorate, and when the relation of $MT < 20 \times MFR^{-0.59}$ is not satisfied in the formula (1) in the case where, for example, melt tension is too high, a taking over process at high speed may be difficult.

The relational formula satisfied by the ethylene-α-olefin copolymer of the present invention is preferably, $$2.2 \times MFR^{-0.59} < MT < 15 \times MFR^{-0.59}, \text{ and}$$

more preferably is, $$2.5 \times MFR^{-0.59} < MT < 10 \times MFR^{-0.59}.$$

The melt tension (MT; unit is cN) in the above-mentioned formula (1) is measured as follows: a melted resin is extruded through an orifice having a diameter of 2.09 mmϕ and a length of 8 mm with a piston at an extrusion speed of 5.5 mm/min at 190° C. using a melt tension tester sold from, for example, Toyo Seiki Seisakusho, and the above-mentioned strand is taken up using a roller having a diameter of 50 mm while increasing rotation speed at a rate of 40 rpm/min per minute. A value of tension which the strand shows just before breaking is regarded as the melt tension in formula (1).

The ethylene-α-olefin copolymer of the present invention is a copolymer in which intrinsic viscosity ([η]; unit is dl/g) and the above-mentioned MFR satisfy the relation of the following formula (2):

$$1.02 \times MFR^{-0.094} < [\eta] < 1.50 \times MFR^{-0.156} \quad (2)$$

A preferable ethylene-α-olefin copolymer of the present invention may be a polymer having a structure of like long chain branching which are entangled closely. And it is considered that an intrinsic viscosity of ethylene-α-olefin copolymer of the present invention is higher than that of the conventional ethylene-α-olefin copolymer having as same MFR as the ethylene-α-olefin copolymer of the present invention due to such structure, and an intrinsic viscosity and MFR of the ethylene-α-olefin copolymer of the present invention satisfies an above-mentioned formula (2).

The ethylene-α-olefin copolymer of the present invention satisfies the relation of the formula (2), and the copolymer of the present invention has low extrusion torque and excellent in extrusion molding processability. When the relation of $1.02 \times MFR^{-0.094} < [\eta]$ is not satisfied in the formula (2) in the case where, for example, intrinsic viscosity ([η]) is too low, impact strength may decrease, and when the relation of $[\eta] < 1.50 \times MFR^{-0.156}$ is not satisfied in the formula (2) in the case where, for example, intrinsic viscosity is too high, extrusion torque may be high and extrusion molding processability may be poor.

The relational formula satisfied by the ethylene-α-olefin copolymer of the present invention is preferably, $$1.05 \times MFR^{-0.094} < [\eta] < 1.47 \times MFR^{-0.156}, \text{ and}$$

more preferably is, $$1.08 \times MFR^{-0.094} < [\eta] < 1.42 \times MFR^{-0.156}.$$

The intrinsic viscosity ([η]; unit is dl/g) in the above-mentioned formula (2) is obtained as follows. 100 mg of an ethylene-α-olefin copolymer is dissolved at 135° C. in 100 ml of tetralin containing 5 wt % of butylhydroxytoluene (BHT) as a heat degradation preventing agent to prepare a sample solution, relative viscosity ($\eta_{rel}$) at 135° C. is calculated from falling times of the above-mentioned sample solution and blank solution using a Ubbellohde viscometer, then, intrinsic viscosity is calculated. The blank solution is tetralin containing 5 wt % of BHT as a heat degradation preventing agent.

$$[\eta] = 23.3 \times \log(\eta_{rel})$$

The melt flow rate (MFR; unit is g/10 minutes) in the formula (2) is the same as the melt flow rate (MFR) used in the formula (1).

The ethylene-α-olefin copolymer of the present invention is a copolymer having the chain length A satisfying the following formula (3):

$$\log A \geq -0.0815 \times \log(MFR) + 4.05 \quad (3).$$

The chain length (A) is a chain length at peak position of a logarithm normal distribution curve of a component having the highest molecular weight among logarithm normal distribution curves obtained by dividing a chain length distribution curve obtained by gel permeation chromatography measurement into at least two logarithm normal distribution curves.

The ethylene-α-olefin copolymer of the present invention satisfies the relation of the above-mentioned formula (3) and the copolymer of the present invention has low extrusion torque and excellent in extrusion molding processability. From the viewpoint of improving extrusion molding processability and external appearance of extrusion-molded articles such as films, a chain length A (log A) is typically 4.3 or less.

The relational formula satisfied by the ethylene-α-olefin copolymer of the present invention is preferably, $$\log A \geq -0.0815 \times \log(MFR) + 4.06, \text{ and}$$

more preferably is, $$\log A \geq -0.0815 \times \log(MFR) + 4.07.$$

The chain length distribution curve is obtained by gel permeation chromatography measurement under the following conditions.

(1) Apparatus: Waters 150 C manufactured by Water
(2) Separation column: TOSOH TSKgel GMH-HT
(3) Measuring temperature: 145° C.
(4) Carrier: orthodichlorobenzene
(5) Flow rate: 1.0 mL/min
(6) Injection amount: 500 μL Distribution of chain length distribution curve is conducted as described below.

First, a chain length distribution curve in which weight ratio (y value) dW/d(log Aw) is plotted against log Aw (x value), which is logarithm of chain length Aw, is measured by gel permeation chromatography measurement. The number of data plotted is more than 300 so as to obtain a continuous distribution curve. Next, four logarithm normal distribution curves (x-y curve) having a standard deviation of 0.30 and an arbitrary average value (usually, corresponding to chain length A at peak position) to the above-mentioned x value are added in arbitrary ratio, to produce a synthetic curve. Further, the average value and the ratio are determined so that the squared deviation sum of a difference between y value of the actually measured chain length distribution curve ($y_{obs}$) and that of synthetic curve ($y_{cal}$) is the minimum value, both of which are plotted against the same x value. It is preferable that the squared deviation sum is as small as possible and usually, it is not more than 0.5% of the squared deviation sum of $y_{obs}$ with respect to the sum of deviation squares in the case where a percentage of each peak is all 0.

When the average value and the ratio giving the minimum squared deviation sum are obtained, log A is calculated from chain length A at a peak position of a logarithm normal distribution curve of a component having the highest molecular weight among logarithm normal distribution curves obtained by division into four logarithm normal distribution curves. The ratio of logarithm normal distribution curve of a component having the highest molecular weight is usually not less than 10% of the synthetic curve.

The ethylene-α-olefin copolymer of the present invention is a copolymer in which characteristic relaxation time at 190° C. (τ; unit is sec) and the above-mentioned MFR satisfy the relation of the following formula (4):

$$\tau \geq 8.1 \times MFR^{-0.746} \quad (4).$$

A preferable ethylene-α-olefin copolymer of the present invention may be a polymer having a structure of like long chain branching which are entangled closely. And it is considered that a characteristic relaxation time of ethylene-α-olefin copolymer of the present invention is higher than that of the conventional ethylene-α-olefin copolymer having as same MFR as the ethylene-α-olefin copolymer of the present invention due to such structure, and a characteristic relaxation time and MFR of the ethylene-α-olefin copolymer of the present invention satisfies an above-mentioned formula (4).

The ethylene-α-olefin copolymer of the present invention satisfies the relation of the above-mentioned formula (4) and the copolymer of the present invention has low extrusion torque and excellent in extrusion molding processability, further, excellent in the appearance of an extrusion molded article such as a film and the like.

From the viewpoint of decreasing extrusion torque to improve extrusion molding processability and improving external appearance of extrusion-molded articles such as film, the above-mentioned characteristic relaxation time (τ) is preferably 20 sec or less.

The relational formula satisfied by the ethylene-α-olefin copolymer of the present invention is preferably, $$\tau \geq 8.2 \times MFR^{-0.746}, \text{ and}$$

more preferably is, $$\tau \geq 8.4 \times MFR^{-0.746}.$$

The characteristic relaxation time (τ) at 190° C. is a numerical value calculated by approximating a master curve with the following cross formula. A master curve is obtained by shifting dynamic viscoelasticity date at each temperature T(K) measured under the following conditions using Rheometrics Mechanical Spectrometer RMS-800 manufactured by Rheometrics as a viscoelasticity measuring apparatus based on the temperature-time superposition theory to give a master curve showing the dependency of dynamic viscosity at 190° C. (η; unit is Pa·sec) on shearing speed (ω: unit is rad/sec).

Measuring conditions of dynamic viscoelasticity data at each temperature T(K):

(1) Geometry: parallel plate, diameter: 25 mm, plate interval: 1.5 to 2 mm
(2) Strain: 5%
(3) Shearing speed: 0.1 to 100 rad/sec
(4) Temperature: 190, 170, 150, 130° C.

Into a sample, an antioxidant such as Irganox 1076 and the like is previously added in suitable amount (for example, 1000 ppm or more), and measurements are all conducted under nitrogen.

Also, an antioxidant such as IRGANOX 1076 in a proper quantity (for example, 1000 ppm or more) is previously compounded into a sample, and all of the measurements are performed under nitrogen.

Cross approximation formula:

$$\eta = \eta_0 / [1 + (\tau \times \omega)^n]$$

($\eta_0$ and n are constants obtained by measurement of dynamic viscoelasticity data of ethylene-α-olefin copolymer, like the characteristic relaxation time τ).

As the calculation software for obtaining a master curve and approximation of a cross formula, Rhios V.4.4.4 manufactured by Rheometrics is used.

A preferable ethylene-α-olefin copolymer of the present invention may be a polymer having a structure of like long chain branching which are entangled closely. And it is considered that an activation energy for a melt flow of ethylene-α-olefin copolymer of the present invention may be higher than that of the conventional ethylene-α-olefin copolymer therefore, such polymer has excellent in extrusion molding processability.

The activation energy for a melt flow (Ea, a unit being kJ/mol) of ethylene-α-olefin copolymer of the present invention is preferably not less than 60 kJ/more from a viewpoint of increasing melt tension at lower temperature and obtaining sufficient molding processability. Not less than 63 kJ/mol is more preferable, and not less than 66 kJ/mol most preferable. From the viewpoint of not decreasing melt viscosity of the ethylene-α-olefin copolymer too much at high temperature and good molding processability and preventing an deterioration in external appearance of extrusion-molded articles such as film, Ea is preferably not more than 100 kJ/mol, and more preferably not more than 90 kJ/mol.

The above-mentioned activation energy for a melt flow (Ea) is a numerical value calculated according to the Arrhenius type equation of the following shift factor ($a_T$) by shifting dynamic viscoelasticity date at each temperature T(K) measured under the same conditions as in calculation of characteristic relaxation time (τ) using Rheometrics Mechanical Spectrometer RMS-800 manufactured by Rheometrics as a viscoelasticity measuring apparatus based on the temperature-time superposition theory, and used as an index for moldability.

Arrhenius type equation of shift factor ($a_T$):

$$\log(a_T) = Ea/R((1/T)-(1/T_0))$$

wherein R is a gas constant, and $T_0$ is a standard temperature (463 K).

As the calculation software, Rhios V.4.4.4 manufactured by Rheometrics is used, and Ea value when correlation factor $r^2$ obtained in linear approximation is 0.99 or more in Arrhenius type plot $\log(a_T)-(1/T)$ is used as the activation energy of flow of the ethylene-α-olefin copolymer of the present invention.

It is more preferable that a ethylene-α-olefin copolymer of the present invention having polymer structure like a long chain branching which is entangled closely as mentioned above is a copolymer having a swell ratio (SR) and intrinsic viscosity ([η]; unit dL/g) which satisfy following formula (5) or (6):

when [η]<1.20, $$-0.91 \times [\eta] + 2.262 < SR < 2 \quad (5),$$

when [η]≧1.20, $$1.17 < SR < 2 \quad (6).$$

A preferable ethylene-α-olefin copolymer of the present invention may be a polymer having a structure of like long chain branching which are entangled closely. And it is considered that SR of ethylene-α-olefin copolymer of the present invention is higher than that of the conventional ethylene-α-olefin copolymer having as same intrinsic viscosity as the ethylene-α-olefin copolymer of the present invention due to such structure, and [η] and SR of the ethylene-α-olefin copolymer of the present invention satisfies an above-mentioned formula (5) or an above-mentioned formula (6).

If the ethylene-α-olefin copolymer of the present invention satisfies the relation between the above-mentioned formula (5) or a formula (6), extrusion torque of the ethylene-α-olefin copolymer is low and its stability during extrusion processing is excellent. Further, extruded articles such as film obtained from the ethylene-α-olefin copolymer is excellent in appearance without roughness occurring on its surface.

The relational formula satisfied by the ethylene-α-olefin copolymer of the present invention is preferably, when [η]<1.23, $$-0.91 \times [\eta] + 2.289 < SR < 1.9,$$

when [η]≧1.23, $$1.17 < SR < 1.9,$$

and further preferably, when [η]<1.30, $$-0.91 \times [\eta] + 2.353 < SR < 1.8,$$

when [η]≧1.30, $$1.17 < SR < 1.8.$$

The swell ratio (SR) in the above-mentioned formula (5) is the value obtained by dividing a diameter D measured at any point between 1 and 6 mm from the tip of strand by the diameter ($D_0$) of an orifice with 2.095 mm ($D/D_0$), wherein the strand is obtained by extruding in the shape of a strand during measuring above mentioned MFR at 190° C. under 21.18 Ns (2.16 kg) of loads and solidified by cooling it. The diameter D is obtained as an average of three strand samples.

The ethylene-α-olefin copolymer of the present invention has a molecular weight distribution of preferably from 3.5 to 25, more preferably from 3.5 to 15, and most preferably from 3.6 to 10, from the viewpoint of extrusion torque, extrusion molding processability, fuming in extrusion molding processing, and flowability. The above-mentioned molecular weight distribution is a value obtained by calculating the weight-average molecular weight (Mw) and the number-average molecular weight (Mn) each based on a polystyrene calibration standard derived from the chain length distribution obtained by the above-mentioned gel permeation chromatography measurement, and dividing Mw by Mn (Mw/Mn).

The density of the ethylene-α-olefin copolymer of the present invention is usually from 890 to 970 kg/cm³ and a value measured according to a method defined in JIS K6760-1981. The above-mentioned density is preferably from 905 to 940 kg/m³, more preferably from 907 to 930 kg/m³ from the viewpoint of balance of the rigidity and impact strength of a film obtained from the ethylene-α-olefin copolymer of the present invention.

From the viewpoint of improving flowability and decreasing extrusion torque to improve extrusion molding processability, a melt flow rate ratio (MFRR) of an ethylene-α-olefin copolymer of the present invention is preferably 50 or more, more preferably 60 or more, and further preferably 80 or more.

The above-mentioned melt flow rate ratio (MFRR) is a valued obtained by dividing a melt flow rate value measured at 190° C. under a load of 211.82 N (21.60 kg) by a melt flow rate value measured under a load of 21.18 N (2.16 kg) according to JIS K7210-1995. For the above-mentioned melt flow rate measurement, a polymer into which 1000 ppm of an antioxidant had been previously added was used.

When the density of the ethylene-α-olefin copolymer of the present invention is not more than 927 kg/m³, the ethylene-α-olefin copolymer usually has at least two melting points (unit is ° C.) from the view point of heat resistance, and the maximum melting point (Tmax) is 115° C. or more, preferably 118° C. or more. In the case where the ethylene-α-olefin copolymer has one melting point below 115° C., it contains fusion component above 118° C.

The above-mentioned melting point includes fusion peak temperatures observed, in compacting 8 to 12 mg of a sample into an aluminum pan, keeping the sample at 150° C. for 2 minutes, then, cooling the sample down to 40° C. at 5° C./min, keeping the sample at 40° C. for 2 minutes, then, heating the sample up to 150° C. at 5° C./min, using a differential scanning type calorimeter DSC-7 type apparatus manufactured by Perkin Elmer. Among them, temperature at a fusion peak position of the highest temperature is the maximum melting point (Tmax).

The method of producing an ethylene-α-olefin copolymer of the present invention includes a method in which ethylene and an α-olefin are copolymerized under a hydrogen condition using the following metallocene olefin polymerization catalyst and the obtained copolymer is kneaded in the following manner.

The metallocene olefin polymerization catalyst used in producing an ethylene-α-olefin copolymer of the present invention includes, for example, a catalyst obtained by contacting a co-catalyst carrier (A), cross-linking type bis-indenylzirconium complex (B) and organoaluminum compound (C), and the above-mentioned co-catalyst carrier (A)

is a carrier obtained by contacting diethylzinc (a), fluorinated phenol (b), water (c) and silica (d).

The amounts of the above-mentioned compounds (a), (b) and (c) are not particularly restricted, and when the molar ratio (a):(b):(c) of the amounts the compounds used is 1:y:z, it is preferable that y and z satisfy substantially the following formula (7):

$$|2-y-2z| \leq 1 \qquad (7).$$

In the above-mentioned formula (7), y represents a number preferably from 0.01 to 1.99, more preferably from 0.10 to 1.80, further preferably from 0.20 to 1.50, most preferably from 0.30 to 1.00.

Regarding the amount of (d) based on (a), the amount of a zinc atom derived from (a) contained in particles obtained by contact of (a) and (d) is preferably 0.1 mmol or more, more preferably 0.5 to 20 mmol in terms of molar number of zinc atoms contained in 1 g of the resulted particles.

The cross-linking bisindenylzirconium complex (B) is preferably racemic-ethylenebis(1-indenyl)zirconium dichloride, or racemic-ethylenebis(1-indenyl)zirconium diphenoxide.

The organoaluminum compound (C) is preferably tri-isobutylaluminum or tri-n-octylaluminum.

The use amount of the cross-linking bisindenylzirconium complex (B) is preferably $5 \times 10^{-6}$ to $5 \times 10^{-4}$ mol per g of the co-catalyst carrier (A). The amount of the organoaluminum compound (C) is preferably from 1 to 2000 in terms of the ratio (Al/Zr) of the molar number of an aluminum atom in the organoaluminum compound (C) to the molar number of a zirconium atom in the cross-linking bisindenylzirconium complex (B).

The polymerization method includes, for example, gas phase polymerization, slurry polymerization and bulk polymerization, and gas phase polymerization is preferable.

The gas phase polymerization reaction apparatus is usually an apparatus having a fluidized bed type reaction vessel, and preferably an apparatus having a fluidized bed type reaction vessel having an enlarge portion. A stirring blade may be installed in the reaction vessel.

As the method of feeding components of a metallocene olefin polymerization catalyst used in production of an ethylene-α-olefin copolymer of the present invention, there are usually used a method in which components are fed using an inert gas such as nitrogen, argon and the like, or hydrogen, ethylene and the like under condition of no water, and a method in which components are dissolved or diluted in a solvent and fed in the form of solution or slurry. Components of the catalyst may be individually fed, or any components may be previously contacted in any order before feeding.

It is preferable that, before effecting the polymerization, previous polymerization is conducted, and the previously polymerized catalyst components are used as the catalyst components or catalyst for the polymerization.

The polymerization temperature is usually less than the temperature at which a copolymer is melted, and preferably from about 0 to about 150° C., more preferably from about 30 to about 100° C.

Also, hydrogen may be added as a molecular weight controlling agent for the purpose of adjusting melt flowability of a copolymer. In addition, inert gas is allowed to coexist in mixed gas.

A kneading method used for producing an ethylene-α-olefin copolymer of the present invention is the following continuous extrusion granulating method.

One method is a method such that a strand is continuously molded by using an extruder provided with an extensional flow mixing (EFM) die developed by Utracki, et al. described in U.S. Pat. No. 5,451,106, the disclosure of which is incorporated herein by reference, so as to be continuously cut and produced as pellets. Another method is a method such that a strand is continuously molded by using an extruder provided with a counterrotating-double screw having a gear pump so as to be continuously cut and produced as pellets. The latter preferably has a residence portion between a screw portion and a die. These kneading methods allows the production of an ethylene-α-olefin copolymer having polymer structure like a long chain branching which is entangled closely.

The ethylene-α-olefin copolymer of the present invention is preferably used in an extrusion molded articles such a film, sheet and the like.

The method of forming a film includes, for example, a method of an inflation film molding process in which an ethylene-α-olefin copolymer of the present invention is melted, extruded from a circular die and swollen in the form of cylinder to give a film, and this film is taken up, and a method of a T die film molding process in which an ethylene-α-olefin copolymer of the present invention is melted, extruded from a linear die to give a film, and this film is taken up.

The ethylene-α-olefin copolymer of the present invention may be added by known additives. Examples of the additives include an antioxidant, weather resistant agent, lubricant, anti-blocking agent, antistatic agent, defogging agent, non-dripping agent, pigment, filler and the like.

The complete disclosure of Japanese application 2003-090847, filed Mar. 28, 2003, from which this U.S. application claims the foreign priority right under 35 U.S.C. 119, is incorporated herein by reference.

As described in detail above, according to the present invention, it is possible to obtain an ethylene-α-olefin copolymer excellent in e4xtrusion molding processability, appearance of an extrusion molded article, impact strength and balance thereof.

EXAMPLES

The present invention is described on the basis of examples and is not limited thereto.

The extrusion moldability in examples was evaluated in the following manner.

(1) Film Processing

A ethylene-α-olefin copolymer was used and processed using a full flight type screw mono-axial extruder of 30 mm φ and L/D=28 manufactured by Placo K.K., a dice of 50 mm φ and a lip gap of 0.8 mm, and a double slit air ring, under conditions of a processing temperature of 170° C., an extrusion rate of 5.5 kg/hr, a frost line distance (FLD) of 200 mm and a blow ratio of 1.8, to obtain a film having a thickness of 30μ.

(2) Extrusion Load

The electric current value of the screw moter and resin pressure of the extruder was compared with corresponding comparative examples for evaluation. The case where both of the electric current value and resin pressure were lower was marked as ◯, higher marked as ×.

(3) Bubble Stability

The stability of inflation bubble was visually observed and compared with corresponding comparative examples for evaluation. The case where the stability was extremely

Example 1

Preparation of Promoter Carrier (A)

1.5 l of tetrahydrofuran and 1.35 l (2.7 mol) of a hexane solution (2 mol/l) of diethyl zinc were charged into a 5-liter four-necked flask in which air was substituted with nitrogen, and cooled to 5° C. A solution such that 0.2 kg (1 mol) of pentafluorophenol was dissolved in 500 ml of tetrahydrofuran was dropped thereinto for 60 minutes. After being dropped, the solution was stirred at a temperature of 5° C. for 60 minutes, heated up to a temperature of 45° C. over 28 minutes and then stirred for 60 minutes. Thereafter, the solution was cooled down to a temperature of 20° C. in an ice bath and 45 g (2.5 mol) of water was dropped thereinto for 90 minutes. After then, the solution was stirred at a temperature of 20° C. for 60 minutes, heated up to a temperature of 45° C. over 24 minutes and then stirred for 60 minutes. And, the solvent was distilled off under a reduced pressure for 120 minutes while heating the solution from 20° C. to 50° C., which was thereafter dried under a reduced pressure at a temperature of 120° C. for 8 hours. As a result, 0.43 kg of a solid product was obtained.

0.43 kg of the above-mentioned solid product and 3 l of tetrahydrofuran were charged into a 5-liter four-necked flask in which air was substituted with nitrogen, and were stirred. 0.33 kg of heat-treated silica at a temperature of 300° C. under nitrogen circulation (Sylopo1948 manufactured by DEBISON; average particle diameter=61 μm; pore volume=1.61 ml/g; and specific surface area=296 $m^2$/g) was added thereto. The solution was heated to a temperature of 40° C. and stirred for 2 hours to thereafter stand and sediment the solid component, and then an upper slurry layer was removed at a point of time when an interface between a layer of the sedimented solid component and the upper slurry layer was observed. As a washing process, 3 l of tetrahydrofuran was added thereto, and stood after stirring, and sediment the solid component. The upper slurry layer was removed at a point of time when the interface was similarly observed. Such a washing process was repeated five times in total. Thereafter, the solution was dried under a reduced pressure at a temperature of 120° C. for 8 hours to thereby obtain 0.52 kg of a promoter carrier (A).

Preparation of Pre-Polymerization Catalyst 125 l of butane containing 2.5 mmol/l as a concentration of tri-isobutyl aluminum and 20 l of hydrogen at normal temperature and pressure were charged into an autoclave with a stirrer having an internal volume of 210 l in which air was previously substituted with nitrogen, which autoclave was thereafter heated up to a temperature of 40° C. Further, ethylene was charged thereinto by 0.05 MPa at gas phase pressure in the autoclave to stabilize the interior of the system, and thereafter 37.5 mmol/l of tri-isobutyl aluminum, 75 mmol/l of racemic-ethylenebis(1-indenyl)zirconium diphenoxide and subsequently 0.48 kg of the above-mentioned promoter carrier (A) were added thereinto to start polymerization. Pre-polymerization was performed at a temperature of 40° C. for 4 hours in total while continuously supplying ethylene and hydrogen. After the polymerization, ethylene, hydrogen gas and the like were purged and the solvent was filtered so as to vacuum-dry the produced solid body at room temperature and obtain a pre-polymerization catalyst component such that 32 g of an ethylene polymer was pre-polymerized with respect to 1 g of the above-mentioned promoter carrier (A).

Polymerization

Ethylene and 1-hexene were copolymerized by using the pre-polymerization catalyst obtained above with a continuous fluidized-bed gas phase reactor. The conditions of the polymerization were as follows: a temperature of 85° C., a total pressure of 2 MPa, a gas linear velocity of 0.28 m/sec, 0.14% as a molar ratio of hydrogen to ethylene, and 1.7% as a molar ratio of 1-hexene to ethylene; ethylene, 1-hexene and hydrogen were continuously supplied in order to constantly maintain gas composition during the polymerization. The above-mentioned pre-polymerization catalyst and tri-isobutyl aluminum were continuously supplied so as to maintain a total powder weight of 80 kg in the fluidized bed at an average polymerization time of 3 hours and a production efficiency of 24 kg/hour, whereby ethylene 1-hexene copolymerization powder was obtained.

Kneading 1000 ppm of calcium stearate and 1800 ppm of Sumilizer GP (manufactured by SUMITOMO CHEMICAL CO., LTD.) were added to the powder of ethylene-1-hexene copolymer obtained above so as to be granulated with the use of an extruder LCM100 manufactured by KOBE STEEL, LTD. under the conditions such as a feed speed of 350 kg/hour, the number of screw revolutions of 450 rpm, a gate opening of 4.2 mm, a suction pressure of a gear pump of 0.2 MPa, and a resin temperature of 204 to 230° C., whereby an ethylene-1-hexene copolymer was obtained. The obtained ethylene 1-hexene copolymer exhibited physical property values and film extrusion moldability shown in Table 1.

Example 2

Preparation of Pre-Polymerization Catalyst

Pre-polymerization was performed in the same manner as Example 1, except that 100 l of butane, 30 l of hydrogen and ethylene by 0.1 Mpa were used, to obtain a pre-polymerization catalyst such that 32 g of an ethylene polymer was pre-polymerized with respect to 1 g of the above-mentioned promoter carrier (A).

Polymerization

Ethylene and 1-hexene were copolymerized by using the pre-polymerization catalyst obtained above with a continuous fluidized-bed gas phase reactor in the same manner as Example 1, except that 0.21% as a molar ratio of hydrogen to ethylene and 1.6% as a molar ratio of 1-hexene to ethylene were employed.

Kneading 1000 ppm of calcium stearate, 2000 ppm of Irgnox1076 (manufactured by CIBA-GEIGY JAPAN LIMITED) and 1600 ppm of P-EPQ (manufactured by CIBA-GEIGY JAPAN LIMITED) were added to the powder of ethylene-1-hexene copolymer obtained above so as to be granulated with the use of a same-direction biaxial extruder BT40-36L manufactured by SUMITOMO HEAVY INDUSTRIES, LTD. provided with a gear pump for feeding a melt to an EFM die and a die on the conditions such as an extruder preset temperature of 200° C., a feed speed of 25 kg/hour, the number of screw revolutions of 150 rpm, a gear pump preset temperature of 180° C., an EFM die preset temperature of 180° C., and a slit interval between converging-diverging plates of 0.1 mm, whereby an ethylene-1-hexene copolymer was obtained. The used EFM die had an outlet circular pipe radius of 10 mm, three slits between converging-diverging plates and a single-sided depth of 10 mm in a magnifying portion between the plates. The obtained ethylene 1-hexene copolymer exhibited physical property values and film extrusion moldability shown in Table 1.

Comparative Example 1

1000 ppm of calcium stearate and 1800 ppm of Sumilizer GP (manufactured by SUMITOMO CHEMICAL CO., LTD.) were added to the powder of ethylene-1-hexene copolymer obtained in Example 1 so as to be granulated with the use of a full-flighted screw uniaxial extruder having 40 mmφ and L/D=28 manufactured by TANABE PLASTICS CO., LTD., on the conditions such as a temperature of 150° C. and the number of screw revolutions of 80 rpm, whereby granulation pellets were obtained. The obtained ethylene 1-hexene copolymerization granulation pellets exhibited physical property values and film extrusion moldability shown in Table 1.

As shown in Table 1, an ethylene-α-olefin copolymer of the present invention is superior in extrusion moldability.

Comparative Example 2

1000 ppm of calcium stearate and 1800 ppm of Sumilizer GP (manufactured by SUMITOMO CHEMICAL CO., LTD.) were added to the powder of ethylene-1-hexene copolymer obtained in Example 2 so as to be granulated with the use of a full-flighted screw uniaxial extruder having 40 mmφ and L/D=28 manufactured by TANABE PLASTICS CO., LTD., on the conditions such as a temperature of 150° C. and the number of screw revolutions of 80 rpm, whereby granulation pellets were obtained. The obtained ethylene 1-hexene copolymerization granulation pellets exhibited physical property values and film extrusion moldability shown in Table 1.

As shown in Table 1, an ethylene-α-olefin copolymer of the present invention is superior in extrusion moldability.

TABLE 1

|  | Example 1 | Example 2 | Comparative Example 1 | Comparative Example 2 |
|---|---|---|---|---|
| Melt Flow Rate MFR (g/10 mm) | 2.0 | 2.2 | 3.0 | 3.4 |
| Melt Tension MT (cN) | 5.4 | 3.2 | 1.7 | 1.6 |
| Left Side of Expression (1) | 1.3 | 1.3 | 1.0 | 1.0 |
| Right Side of Expression (1) | 13.3 | 12.6 | 10.4 | 9.7 |
| [η](g/dL) | 1.12 | 1.08 | 1.12 | 1.08 |
| Left Side of Expression (2) | 0.96 | 0.95 | 0.92 | 0.91 |
| Right Side of Expression (2) | 1.35 | 1.33 | 1.26 | 1.24 |
| Ea (kJ/mol) | 74 | 68 | 51 | 48 |
| logA | 4.11 | 4.03 | 4.11 | 4.03 |
| Right Side of Expression (3) | 4.03 | 4.02 | 4.01 | 4.01 |
| τ (sec) | 8.1 | 8.3 | 5.3 | 5.2 |
| Right Side of Expression (4) | 4.9 | 4.5 | 3.5 | 3.3 |
| SR | 1.55 | 1.54 | 1.31 | 1.33 |
| Right Side of Expression (5) | 1.24 | 1.28 | 1.24 | 1.28 |
| Density (kg/m³) | 917.6 | 921.1 | 917.6 | 921.0 |
| Mw/Mn | 3.8 | 5.8 | 3.8 | 5.8 |
| Melt Flow Rate Ratio MFRR | 54 | 52 | 50 | 47 |
| Maximum Melting Point Tmax (° C.) | 121.5 | 119.0 | 121.5 | 119.0 |
| Melting Component of 118° C. or more | Present | Present | Present | Present |
| Extrusion Load | ◯ | ◯ | ◯ | ◯ |
| Bubble Stability | ◎ | ◎ | Δ | Δ |

What is claimed is:

1. A copolymer of ethylene and α-olefin of from 4 to 20 carbon atoms, having melt flow rate of from 2.0 to 100 g/10 min, an activation energy for melt flow of 60 kJ/mol or more, melt tension at 190° C. (MT), intrinsic viscosity ([η]) and a chain length A which satisfy the following formula (1) to (3), wherein the chain length A is a chain length at peak position of a logarithm normal distribution curve of a component having the highest molecular weight among logarithm normal distribution curves obtained by dividing a chain length distribution curve obtained by gel permeation chromatography measurement into at least two logarithm normal distribution curves:

$$2 \times MFR^{-0.59} < MT < 20 \times MFR^{-0.59} \quad (1),$$

$$1.02 \times MFR^{-0.094} < [\eta] < 1.50 \times MFR^{-0.156} \quad (2), \text{ and}$$

$$\log A \geq -0.0815 \times \log(MFR) + 4.05 \quad (3).$$

2. A copolymer of ethylene and α-olefin of from 4 to 20 carbon atoms, having melt flow rate of from 2.0 to 100 g/10 min, an activation energy for melt flow of 60 kJ/mol or more, melt tension at 190° C. (MT), intrinsic viscosity ([η]) and a characteristic relaxation time (τ; unit is sec) at a temperature of 190° C. which satisfy the following formula (1), (2) and (4):

$$2 \times MFR^{-0.59} < MT < 20 \times MFR^{-0.59} \quad (1),$$

$$1.02 \times MFR^{-0.094} < [\eta] < 1.50 \times MFR^{-0.156} \quad (2), \text{ and}$$

$$\tau \geq 8.1 \times MFR^{-0.746} \quad (4).$$

3. The copolymer of ethylene and α-olefin of from 4 to 20 carbon atoms according to claim 1 or 2, wherein a swell ratio (SR) and the [η] satisfy a relation of the following formula (5) or (6):

in a case of [η]<1.20, $$-0.91 \times [\eta] + 2.262 < SR < 2 \quad (5), \text{ and}$$

in a case of [η]≧1.20, $$1.17 < SR < 2 \quad (6).$$

4. The copolymer of ethylene and α-olefin of from 4 to 20 carbon atoms according to claim 1, wherein the copolymer has a melt flow rate of from 2.0 to 8 g/10 min.

5. The copolymer of ethylene and α-olefin of from 4 to 20 carbon atoms according to claim 2, wherein the copolymer has a melt flow rate of from 2.0 to 8 g/10 min.

* * * * *